UNITED STATES PATENT OFFICE 2,206,805

ANTISEPTIC

Robert R. Burtner, Niles Center, Ill., assignor to G. D. Searle & Co., Chicago, Ill., a corporation of Illinois No Drawing. Application February 3, 1938, Serial No. 188,572

2 Claims. (Cl. 167—71)

This invention relates to antiseptics, and more particularly to germicidal compounds of the organic mercury type.

The primary object of the invention is to provide a substance which not only possesses high antiseptic powers against micro-organisms, but is also relatively non-irritating to body tissue.

Another object is to provide an organic mercury compound antiseptic of relatively higher solubility, but of lower toxicity to the tissues of the host, than other organic mercury derivatives heretofore used for like purposes.

It has been discovered that these and other related objects may be advantageously attained by the use as antiseptics of certain mercurials of the furan series. As a result of extended investigations, it would appear that all derivatives of any of the isomeric furylmercurials are suitable for use as antiseptics, and that all of these compounds, while varying somewhat in effectiveness between one another, are relatively non-irritating to body tissue and of relatively high toxicity to micro-organisms when compared with most other known antiseptics. Among the compounds by the use of which successful antiseptic results have been obtained are 2-furylmercuric chloride and its 5-methyl-, 5-tertiary butyl-, 5-bromo- and 5-nitro-derivatives; 3-furylmercuric chloride and its 2,5-dimethyl derivative; and 5,5'-dinitro-2,2'-difuryl-mercury.

The derivatives of the isomeric furylmercurials falling within the scope of the present invention may be represented by the formulae.

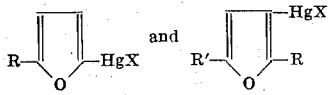

wherein R and R' may be H, $CH_3$, $C_3H_7$, $C_4H_9$, $C_5H_{11}$, Cl, Br, or $NO_2$, and X may be the anion of any acid, whether organic or inorganic, such as Cl, Br, I, $NO_3$, $CH_3COO$, $H_2BO_3$, $BO_2$ and $O.C_6H_2(NO_2)_3$, OH, or

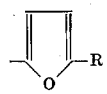

The expressions used are intended to be general so as to include the various positional isomers.

The furan mercurial antiseptics of the present invention may be prepared in any suitable manner. For example, 2-chloromercurifuran (furylmercuric chloride) may be obtained from a solution of 340 g. (5.0 moles) of furan, prepared by decarboxylation of furoic acid, in 2100 cc. of ethanol, chilled to 10° and added to a solution of 1350 g. (5.0 moles) of mercuric chloride and 2710 g. (20.0 moles) of sodium acetate in 30 l. of water which has been previously cooled to 10°. The bottle should be immediately tightly stoppered and allowed to stand for two days at laboratory temperature with occasional shaking. The crude mercurial may then be filtered out, air dried and crystallized from 10 l. of ethanol. The yield of pure white 2-chloromercurifuran melting at 153° will be about 550 g. Additional amounts of less pure material may be recovered from the alcoholic mother liquor by dilution with water. Also about 410 g. of 2,5-dichloromercurifuran may be obtained as an insoluble precipitate during crystallization.

A solution of furylmercuric hydroxide may be prepared by adjusting the pH of a suspension of furylmercuric chloride in water to 9.2 by cautious addition of dilute alkali.

Furylmercuric acetate may be prepared by treating a methanol solution of furylmercuric chloride with silver acetate, filtering out the precipitated silver chloride, evaporating the filtrate to dryness, and crystallizing the residue from water-acetone solution. By using silver nitrate in the same manner the basic furylmercuric nitrate may be obtained.

Furylmercuric chloride, bromide or iodide may be prepared by the addition of one equivalent of the desired sodium halide to a saturated aqueous solution of furylmercuric acetate.

2-chloromercurifuran, 5-bromo- 2- chloromercurifuran, 5-methyl-2-chloromercurifuran, 5-isopropyl-2-chloromercurifuran, 5-tertiary butyl-2-chloromercurifuran, 5 -tertiary amyl-2-chloromercurifuran and 5-hexyl-2-chloromercurifuran may be prepared from furoic acids by preparing a solution of one mole of the sodium 5-substituted-2-furoate (made by dissolving the acid in exactly one equivalent of sodium hydroxide) in 0.5–5.0 l. of water at laboratory temperature. This is added to a solution of one mole of mercuric chloride, and after one hour the mixture is filtered and then refluxed until the evolution of carbon dioxide is complete. On cooling, the mercurial may be filtered and crystallized from ethanol. These mercurials (except 5-bromo-2-chloromercurifuran) may also be prepared by mercuration of the alkyl furans in the same manner as described above for the mercuration of furan.

5-nitro-2-chloromercurifuran may be prepared by heating an aqueous solution of sodium 5-nitro-2-furoate (0.4 mole) and 0.8 mole of mercuric chloride at 150°–160° in an autoclave for one hour, filtering the hot solution, and then drying and extracting the precipitate with 150 cc. of boiling ethanol for several hours. Evaporation of the alcoholic extract will yield about 5.2 g. of the desired mercurial melting at 208°. The aqueous filtrate from the reaction mixture may be chilled and filtered to give about 30.3 g. of crude product crystallized from acetone. The total yield of pure 5-nitro-2-chloromercurifuran melting at 208° will be about 35 g. From the aqueous filtrate there may be recovered 50% of the original 5-nitro-2-furoic acid.

To prepare 3-chloromercurifuran, acetoxymercury furoate or its equivalent is first prepared by adding a solution of 366 g. (3 mols) of furoic acid in 3 l. of water to a stirred solution of 477 g. (1.5 moles) of mercuric acetate in 75 l. of water. The precipitate should be filtered out and air dried, giving a yield of about 490 g. 740 g. of the acetoxymercury furoate should then be spread out in a thin layer over the bottom of a suitable container placed on a hot plate at 140° for two days. The material should then be suspended in 900 cc. of 95% acetic acid, wherein it will dissolve in about twenty-four hours with slight heat evolution. This solution should then be poured into 8 l. of water, filtered and the filtrate treated with sodium chloride until no further precipitate is formed. The precipitate when filtered, washed with water, and dried over a steam plate will yield about 270 g. of solid which should be extracted with ether in a Soxhlet apparatus for eight to ten hours. When the ether is evaporated it will leave about 95 g. of crude 3-chloromercurifuran which may then be crystallized from ethanol to yield about 87.5 g. of pure product melting at 184.5°.

To prepare 2,2'-difurylmercury, add at once to a solution of 50 g. of sodium thiosulfate in 200 cc. of water 0.1 mole of 2-chloromercurifuran; the mixture should then be shaken vigorously for a few minutes, and after eight hours the precipitate filtered to give a 95% yield of crude difurylmercury which may be purified by crystallization from acetone-water solution. The pure product will melt at 114°.

2,5-dimethylfuran may be mercurated in the same manner as furan to give a 50% yield of 2,5-dimethyl-3-chloromercurifuran melting at 164°.

The furyl mercuric compounds of the present invention are more soluble than other organic mercurials and may be prepared in more concentrated solutions for dispensing or other purposes. When used as antiseptics they are usually prepared in the form of glycerin, alcohol or other non-aqueous concentrates to which water is then added to provide solutions of the desired concentration, and may be administered by local application, orally, or injection. These same mercurials may also be embodied in ointments, tinctures and other pharmaceutical preparations wherein antiseptic properties are desired.

In studying the properties of these furyl mercuric derivatives, the general principles as stated by Salle and co-workers were employed. This consists in determining the concentrations of antiseptic which kill *Staphylococcus aureus* and *Bacterium coli* on ten minute exposure, and comparing this with the maximum concentration which is not fatal to embryonic heart tissue on 24 hour exposure. The embryonic heart tissue is chosen as being analogous to living tissue in general, and is used to determine the degree of irritation produced by the antiseptic in question. Typical data on the antiseptic action are as follows:

*Killing dilutions in 24 hours*

| Name of compound | Constant contact for ten minutes and then transferred | |
|---|---|---|
| | Staphylococcus aureus | Bacterium coli |
| 2-furylmercuric chloride (1:30 dioxan). | 1:25,000 | 1:30,000 |
| 5-methyl-2-furylmercuric chloride (1:30 dioxan). | <1:10,000 (stronger concentration not possible). | 1:15,000 |
| 5-bromo-2-furylmercuric chloride (1:30 dioxan). | <1:10,000 (stronger concentration not possible). | 1:20,000 |
| 5-nitro-2-furylmercuric chloride (1:50 dioxan). | 1:30,000 | 1:60,000 |

In the tissue culture experiments the compounds were found to be relatively non-irritating, as compared to their antiseptic value against bacteria.

Extended clinical investigations have also been made as to the antiseptic properties of the furan mercurials of the present invention wherein it has been established that these substances are both highly antiseptic in their action on microorganisms and relatively non-irritating to body tissue. Simply by way of example, it may be noted that a solution of 2-furylmercuric chloride, one of the preferred forms of the invention, has been used in the human eye with marked antiseptic effect but without injury to the eye.

There is thus provided by the present invention a new antiseptic of the organic mercury type which is of improved characteristics of various respects, and of highly effective and dependable action for the purposes intended.

This application is limited to the particular species defined in the appended claims, the generic aspects of the invention and certain of the other species being the subject matter of copending application Serial No. 276,719, filed May 31, 1939.

What is claimed is:

1. An antiseptic preparation for use in contact with human tissue comprising furylmercuric chloride.

2. An antiseptic preparation comprising 2-furylmercuric chloride.

ROBERT R. BURTNER.